Nov. 24, 1925.
G. J. HARDGROVE
MICROMETER HEIGHT GAUGE
Filed June 8, 1923
1,562,554
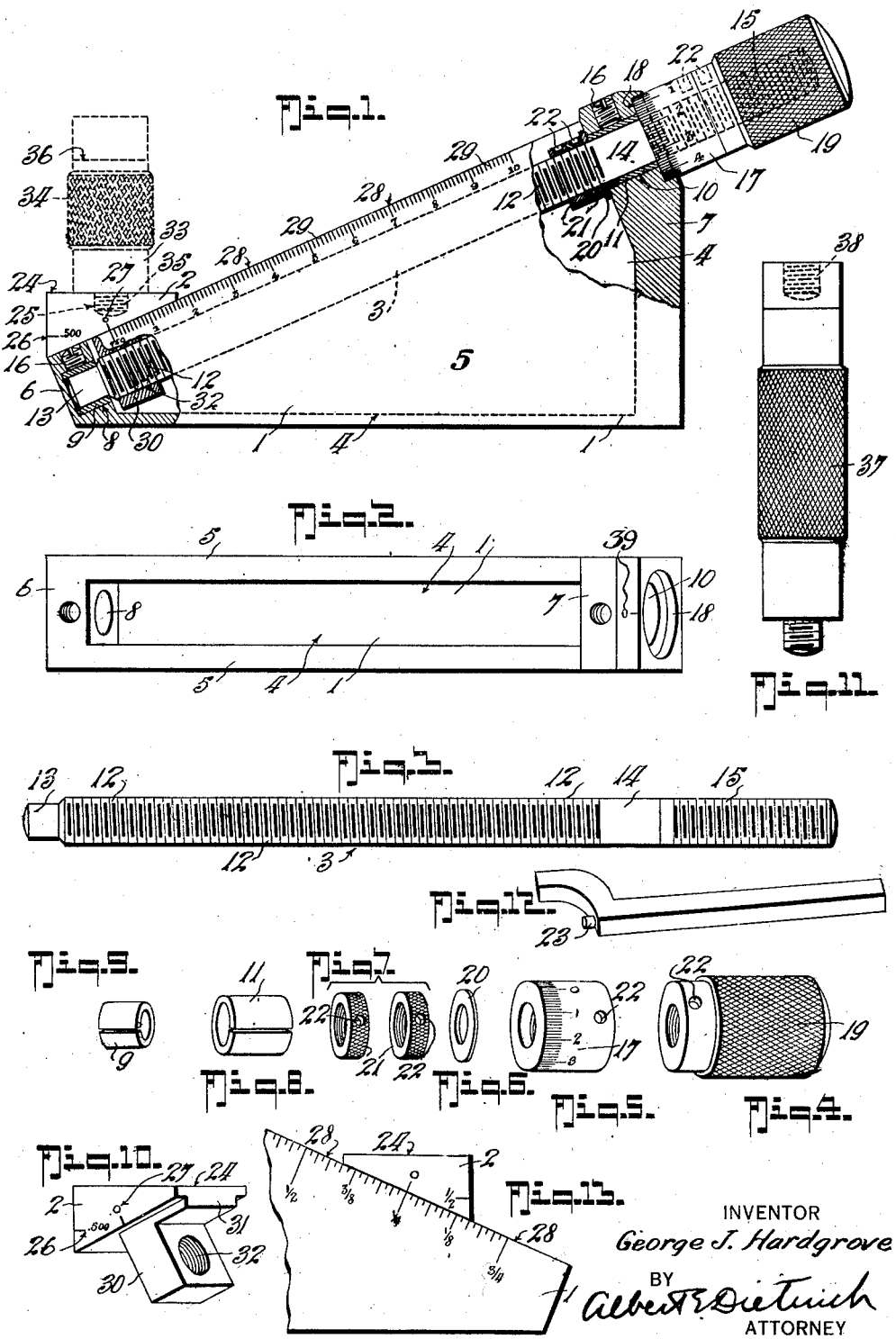
INVENTOR
George J. Hardgrove
BY
Albert E. Dietrich
ATTORNEY Patented Nov. 24, 1925.

1,562,554

UNITED STATES PATENT OFFICE.

GEORGE J. HARDGROVE, OF LOVELL, WYOMING.

MICROMETER HEIGHT GAUGE.

Application filed June 8, 1923. Serial No. 644,203.

*To all whom it may concern:*

Be it known that I, GEORGE J. HARDGROVE, a citizen of the United States, residing at Lovell, in the county of Big Horn and State of Wyoming, have invented a new and Improved Micrometer Height Gauge, of which the following is a specification.

The invention resides in the provision of an improved construction of micrometer height gauge which is absolutely self-contained and which will gauge any required height to one ten-thousandths of an inch.

Primarily the invention has for its object to provide a gauge of the type stated which is capable of rapidly and accurately truing up a piece of work in a lathe chuck and facing a surface parallel to one already faced to within a ten-thousandth of an inch and which is adaptable to use in connection with milling machines, boring machine, planers and the like, in a manner whereby the same will effectively and practically function to effect the desired gauging for which it is designed, accurately and in a manner whereby the wasteful cut-and-try method commonly employed will be eliminated.

The invention more especially has for its object to provide a gauge of the type stated in which the parts are designed for effecting accurate gauging, graduated and cooperative in a manner for effecting adjustments more minute and more easily readable than is common in tools of this type, and in which provision is made for so adjusting and operating the parts of the invention as to make provision not only for the normal range of action of the same but also for a variation of increased ranges of action thereof.

The invention still further has for its object the provision of means whereby the United States standard scale of measurement may be used in cooperation with the other micrometer features of my improved gauge.

With the above and other objects in view, the invention resides in those novel details of construction, combination of and arrangement of parts, all of which will be first fully described in detail, then be specifically pointed out in the appended claims, reference being had to the accompanying drawing, in which the figures are all shown on a somewhat enlarged scale for practical reasons.

Figure 1 is a side elevation on an enlarged scale of my invention, parts being broken out and in section, an extension member being shown operatively applied to the sliding gauge block in dotted lines.

Figure 2 is a top plan view of the base body.

Figure 3 is a detail view of the operating screw.

Figure 4 is a detail perspective view of the turning head.

Figure 5 is a detail perspective view of the scale collar.

Figure 6 is a detail perspective view of the bearing washer.

Figure 7 is a detail perspective view illustrating the pair of cooperating lock nuts.

Figure 8 is a detail perspective view of the rear split bearing bushing.

Figure 9 is a detail perspective view of the front split bearing bushing.

Figure 10 is a detail perspective view of the sliding gauge block.

Figure 11 is a detail side elevation of one of the extension members.

Figure 12 is a detail perspective view of a type of wrench which may be used in connection with the gauge.

Figure 13 is a detail side elevation of a portion of the reverse side of my gauge to that illustrated in Figure 1 and illustrates the adaptation of the United States standard scale thereto.

In the drawing, in which like numerals indicate like parts in all of the figures, 1 indicates the base body of my improved micrometer height gauge with which the sliding gauge block 2 slidably cooperates through the action of the operating screw 3 in a manner and for the purposes hereinafter to be described.

The base body 1 is hollowed as at 4 to form a pair of opposite side walls 5, a front wall 6 and a rear wall 7.

The front wall 6 is provided with a socket bore 8 for accommodating a split bearing bushing 9 and the rear wall 7 is provided with a bore 10 for accommodating a split bearing bushing 11 in the manner and for the purposes later to be described.

The operating screw 3 includes a main threaded portion 12, a reduced bearing portion 13, which is adapted to be journaled in the split bearing bushing 9, a bearing portion 14, which is adapted to be journaled in the split bearing bushing 11 and a threaded outer end 15, the purpose of which will soon appear. Suitable set screws 16 are introduced into the front and rear walls 6 and 7 and are adapted to engage the split bearing bushings 9 and 11. By adjusting the set screws 16 the frictional contact of the bearing portions of the screw 3 within the said bushings may be adjusted to effect such degree of frictional engagement as may suit the desires of the user of my improved gauge. It will also be readily understood that by these means it is also possible to clamp the operating screw 3 to any particular adjustment.

A scale collar 17 is threaded upon the outer threaded end 15 of the operating screw 3, and the rear wall 7 of the base body 1 is provided with a counterbored socket 18 for accommodating the said scale collar. A knurled turning head 19 is threaded upon the outer end of the threaded portion 15 of the operating screw 3 and the head acts as a turning medium for the said screw and also as a lock nut for properly locking the scale collar 17 in its relation with the operating screw.

The operating screw 3 is securely held in rotative relation with the base body and within the bearing bushings 9 and 11 by reason of the relation of the scale collar 17 with the rear wall 7 and in the bearing socket 18 thereof, and a bearing washer 20 held in proper position in cooperative relation with the bearing bushing 11, by a pair of knurled lock nuts 21.

The lock nuts 21, the scale collar 17 and the turning head 19 are each provided with wrench holes 22 for accommodating the turning pin 23 of a wrench such as is indicated in Figure 12, and which may be effectively used in properly applying and adjusting the members hereinbefore referred to.

The sliding gauge block 2 is provided with a height gauging face 24, in which is provided a threaded aperture 25, is provided on its side faces with indicating markings. 500, as is indicated at 26, and a "0" marking, as is indicated at 27, on the one side thereof, and at the same points on the opposite side thereof with a ½" and a 0 marking, the purpose of which will presently appear.

It will be observed by reference to Figure 1 that the upper faces of the side walls 5 incline as at 28 on an angle of 23° 36.14', or on an incline of approximately 4.8" to the foot and the outer face of the inclined portion of each of these side walls 5 is provided with scale markings, as is indicated at 29, one side thereof, see Figure 1, being marked in a special manner, hereinafter referred to, and the opposite side thereof being marked with the United States standard scale.

In Figure 1 my improved micrometer height gauge is shown at the lowermost limit of its range of operation that is, the height gauge face 24 is there illustrated at the ¾" height with the .500 marking indicated at 26, indicating the ½" height reckoned from the base of the base body. This is the lowermost limit of the range of my improved gauge and, as will hereinafter be readily apparent, the said gauge is capable of properly gauging any desired height from this point upward in ten-thousandths of an inch.

When using the parts shown in full lines in Figure 1 and with the instrument designed with a limit of longitudinal travel of the block 2 of 2½ inches the corresponding vertical travel or height gauge range will be 1". For suitably taking care of greater ranges of height gauging than is possible in the structure shown in full lines in the figure indicated, I have provided means for extending the range of the gauge, as will presently appear.

The sliding gauge block 2 is provided with a pendent portion 30 and a guide portion 31 which extend into the hollow portion 4 of the base body 1 to move in close fit therewith under action of the operating screw 3 which cooperates with the threaded aperture 32 through the pendent portion 30 in effecting the longitudinal sliding of the said gauge block.

For properly providing for an extension of the range of action of my gauge, as above indicated, I provide one or more extension members 33, such as is indicated in dotted lines in Figure 1, and these extension members include a knurled portion 34, for facilitating the quick application thereof in cooperation with the sliding gauge block 2, with the threaded shank 35 thereof threaded into the socket 25 provided therefor in the sliding gauge block. The extension member 33, illustrated in Figure 1, is a standard one inch extension, by the use of which the range of action of the gauge is increased exactly one inch. The extension member may be provided with an intermediate ¾" indicating marking 36 for aiding in the gauging action.

While I have illustrated in Figure 1 a one inch extension member, it will be readily understood that extension members of like construction but of varied standard sizes may be used in connection with my gauge so that the range of action of the same may be extended to any degree without varying the accurate gauging of heights in ten-thousandths. For example, a 2" extension 37 is indicated in Figure 11, which extension is of like design as the extension illustrated in Figure 1, except for its length.

It will be also understood by reference to Figure 11 that each of these extension members may be provided at its upper gauging face with a threaded socket 38 of such size as will readily accommodate the threaded shank 35 of another such extension member so that two or several extension members may be used cooperatively for acquiring the desired gauging range.

It will be readily understood that by turning the head 19 the sliding gauge block 2 will be moved longitudinally along the inclined portions 28 of the walls 5 to thereby properly gauge the height in the accurate manner provided for by the special scale marking employed in my invention.

In the practical development of my invention, the pitch of the threads of the main threaded portion 12 of the operating screw 3, is forty threads to the inch, so that by one complete revolution of the turning head 19, the sliding gauge block 2 will be moved longitudinally one-fortieth of an inch. Each such movement of one-fortieth of an inch, by reason of the exact incline of the walls 5 at 28 on an angle of 23° 36.14′ (4.8″ rise per foot) effects a vertical movement of the sliding gauge block 2 of one one-hundredth of an inch.

By reference to Figures 1 and 5, it will be observed that the scale collar 17 has the fore face thereof, which is in cooperative relation with the socket 18, divided into ten principal divisions, around the periphery thereof, which cooperate with a 0 marking on the top face of the rear wall 7 of the base body and which is indicated at 39 in Figure 2.

As before stated, one complete revolution of the turning head 19 effects a longitudinal movement of the slide block 2 of one-fortieth of an inch and a vertical movement thereof of one one-hundredth of an inch. From this, it will be readily apparent that a movement of the turning head a distance of one of the principal divisions indicated on the scale body 17, that is, one-tenth of a revolution, a vertical movement of the sliding gauge block 2 of one one-thousandth of an inch will be effected.

By reference to the said Figures 1 and 5 it will be observed that the main division of the scale collar 17 into tenths is again sub-divided, as is roughly indicated in those figures. In the practical development of my invention this sub-division is in tenths so that the scale collar 17 is divided into tenths and hundredths and, as it is apparent from the detailed description above, the movement of the turning head 19 a distance of one of the main or one-tenth divisions of the scale body will effect a raising of the sliding gauge block 2 of one-thousandth of an inch. It will be just as readily understood that movement of the turning head 19 a distance of one of the hundredths divisions of the scale collar will effect a raising of the sliding gauge block 2 of one ten-thousandths of an inch.

Assume that the sliding gauge block 2 has a limit of movement of two and a half inches longitudinally, by reason of the degree of incline 28, a corresponding vertical movement of one inch is effected. This complete longitudinal movement of two and a half inches is effected by one hundred revolutions of the turning head 19, which will be apparent from the description foregoing.

The special scale marking indicated at 29 in Figure 1 shows a scale divided principally into tenths and sub-divided in one-hundredths, the first one of the one-hundredths divisions, that is the start of the scale, is marked .750 and is adapted to register with the 0 mark 27 on the sliding gauge block 2 and indicates a gauging height of the face 24 of the block 2 with relation to the base of the base body 1 of .750 or ¾ of an inch, its lowermost adjustment.

By reason of the cooperation of the sliding gauge 2 with the accurately designed incline 28, and the cooperation of the accurately designed pitch of the operating screw 3, it is possible to provide my micrometer gauge with scales which are much easier to observe and read, considering the great degree of accuracy of my invention, than is possible in any conventional type of micrometer gauge. By this special arrangement and cooperation of parts as above described it is possible for me to provide the graduations on my improved gauge two and a half times as far apart as is common on any standard scale. This feature proves very valuable to one using my improved micrometer gauge whose eye-sight has become impaired and who would find great difficulty reading minute measurements by use of the almost infinitesimal gradations which would be necessary on a common type of micrometer gauge designed to function with the same degree of accuracy possible in the structure disclosed herein.

As before described, the graduations illustrated in Figure 1 are of a special nature peculiar to the specific functioning of my improved construction of micrometer gauge, that is they are divided into tenths and one-hundredths to specifically cooperate with the graduations upon the collar scale 17.

By reference to Figure 13, it will be observed that the opposite side of my gauge to that illustrated in Figure 1 is provided with United States standard scale of graduation that is, into inches and fractions of an inch. The marking .500 indicated at 26 on Figure 1 will, on this side, be marked according to the United States standard scale one-half inch. The 0 marking indicated at 27 on Figure 1 will, of course, remain the same but the .750 indicating the beginning of the scale in Figure 1 will, on this side, be marked to the United States standard scale three-quarters.

By reference to the figures indicated it will be readily understood that in utilizing the standard scale in cooperation with this micrometer, it is possible, for reasons above described, to make these gradations also two and a half times their normal size, to greatly facilitate the ready observation and reading of the height indicated. As above stated, the range of longitudinal movement of the sliding gauge block 2 on the inclines 28 and walls 5 is two and a half inches and in utilizing the standard scale, as above referred to, this path of travel of two and a half inches is made to represent a single United States standard inch of graduation, that is, the actual two and a half inches may be divided according to the United States standard scale measurement as though it were a single inch and be divided into halves, quarters, thirty-seconds and sixty-fourths, as is common in such sales.

By thus providing the opposing side of my gauge body with the standard scale and forming the individual markings thereof two and a half times their usual size, it will be readily apparent that the movement of the gauge block 2, the degree of such movement being clearly indicated on the United States standard scale, that is, should the turning head 19 be given one hundred complete revolutions the mark 27 on the gauge block 2 will register one inch of vertical movement. It will be readily understood that the lesser degrees of vertical movement thus effected through rotation of the turning head 19 will be accurately indicated on the standard scale.

By thus providing the standard scale and arranging the same as above described, it will also be readily apparent that the said scale cooperates with the special scale at the opposite side of the gauge body and with the scale collar 17 in indicating very accurate adjustments, as for example, supposing that the height to be gauged was one inch plus one-thousandth, the smallest adjustment of the gauge, as illustrated in Figure 1, providing for a gauge height of exactly 3/4", it will be readily understood that in order to adjust the gauge to the height desired, movement vertically of the sliding gauge block to the extent of a quarter of an inch plus one-thousandth will have to be effected. Inasmuch as the 0 mark on the gauge block is, when the parts are positioned as shown in Figure 1, in register with the 3/4, the starting mark on the United States standard scale, it is apparent that the head 19 would be revolved until the 0 mark, above referred to, registered with the one-fourth on an inch mark on the standard scale, thus indicating a present height of the gauge face 24 of the block 2 of exactly 1". It will now be necessary to raise the said face 24 an additional one-thousandth of an inch. This will be accomplished by further rotating the head 19 a distance equivalent to one of the major divisions of the scale collar 17, as hereinbefore described. Thus it will be seen that the United States standard scale arrangement readily cooperates with the special scale arrangement, the operating screw, and the scale collar in effecting the very minute adjustments possible by reason of the peculiar construction and arrangement of my improved micrometer height gauge.

By reason of the combination of scale markings, the angular base body, the sliding gauge block and the operating screw divisions, it will be readily apparent that by the use thereof one can readily and accurately true up a piece of work in a lathe chuck and face a parallel surface to one already faced to within a ten-thousandth of an inch, by placing the base of the gauge against the chuck face and using the said sliding gauge block for truing the work through the action of the operating screw 3, as before described.

It will also be readily apparent to anyone familiar with milling machines, boring mills, planers and shapers, by setting the gauge at the required height and bringing the cutting tool in contact with the same, that the cut can be taken accurately, thereby eliminating entirely a "cut and try method" and all of the waste of material and time incident thereto.

By reason of the combination and cooperation of the scale arrangements, special and United States standard, quick and accurate readings may be made and by reason of the actual markings being two and a half times the usual size, made possible by the incline arrangement, reading may be made by persons with slightly impaired eye-sight which could not be possible with the conventional types of scales.

The .500 parallel line 26 on one side of the slide block and the 1/2 inch line on the other side of the block, also the circular graduation 36 on the extension rods are placed there for the purpose of setting a surface gauge.

While I have illustrated my invention as especially designed for use with the standard scale (English system) it is obvious that with but slight modification it may be adapted for use with scales graduated according to the metric system.

The end of the screw 13 where it engages the walls 6 (see Figure 1) is preferably convex to reduce the area of contact and thus reduce friction at that place.

From the foregoing description, taken in connection with the accompanying drawing, it is thought the complete construction, operation and advantages of my invention will be readily understood by those skilled in the art to which it appertains.

What I claim is:

1. A device of the class described, comprising a body having a base and an inclined surface, the inclination of which to the base is at an angle of 23° 36.14', said body having a pair of screw bearings, the axes of which lie at the same inclination as that of the inclined surface of the body, a screw rotatably held in said bearings against longitudinal movement and having a pitch of forty threads per inch, a movable member mounted to slide on the inclined surface of said body and having a threaded portion to engage said screw, said body having a scale associated with said inclined surface and said movable member, and means by which said screw may be turned.

2. A device of the class described, comprising a body having a base and an inclined surface, the inclination of which to the base is at an angle of 23° 36.14', the said body having a pair of screw bearings, the axes of which lie at the same inclination as that of the inclined surface of the body, a screw rotatably held in said bearings against longitudinal movement and having a pitch of forty threads per inch, a movable member mounted to slide on the inclined surface of said body and having a threaded portion to engage said screw, said body having a scale associated with said inclined surface and said movable member, and means by which said screw may be turned, said means having a decimal scale cooperative with said body scale to locate said movable member along said body.

3. In a device of the class described, a body having a base and an inclined surface, said body being recessed in said inclined surface and provided with upper and lower screw bearings, a slide mounted on said inclined surface of said body and having a portion projecting into the recess therein, an adjusting screw engaging said portion and being mounted in said upper and lower bearings, and means by which said screw may be turned to adjust the position of said slide.

4. In a device of the class described, a body hving a base and an inclined surface, said body being recessed in said inclined surface and provided with upper and lower screw bearings, a slide mounted on said inclined surface of said body and having a portion projecting into the recess therein, an adjusting screw engaging said portion and being mounted in said upper and lower bearings, means by which said screw may be turned to adjust the position of said slide, and means to hold said screw against longitudinal movement in its bearings, said means comprising jamb nuts and washer with provision for taking up wear.

5. In a device of the class described, a body having a base and an inclined surface, said body being recessed in said inclined surface and provided with upper and lower screw bearings, a slide mounted on said inclined surface of said body and having a portion projecting into the recess therein, and adjusting screw engaging said portion and being mounted in said upper and lower bearings, means by which said screw may be turned to adjust the position of said slide, split bushings in said screw bearings, and means engaging said bushings to adjust their gripping action on the screw.

6. In a device of the class described, a body having a base and an inclined surface and graduations constituting a scale adjacent to said inclined surface, said body also having a screw bearing with split bushing and bushing adjusting screw, a movable member mounted on said body to move along its inclined surface, an adjusting screw mounted in said screw bearing and engaging said movable member and having a smooth bearing surface with threaded surfaces at each side of said bearing surface, a scaled collar and a turning head threaded on one end of said adjusting screw, said body being engaged by said collar, a washer and jamb nut on said screw to cooperate with said scale collar to hold the screw against longitudinal movement in its bearing, substantially as shown and described.

7. A device of the class described comprisng a body, a member cooperative with said body and movable longitudinally and vertically with relation to the bottom of said body, means whereby the said member may be moved in such manner that the longitudinal movement thereof will be greater than the vertical movement thereof, and said body having a plurality of measuring scales cooperatively arranged for indicating standard and decimal fractions of inch movement of said movable member said means whereby said member may be moved comprising an adjusting screw, said body having bearings in which said screw is mounted and means in said bearings for taking up wear.

8. A device of the class described comprising a body, a member cooperative with said body and movable longitudinally and vertically with relation to the bottom of said body, means whereby the said member may be moved in such manner that the longitudinal movement thereof will be greater than the vertical movement thereof, and a plurality of measuring scales cooperatively arranged for indicating standard and decimal fractions of inch movement of said movable member, said means whereby said member may be moved comprising an adjusting screw, said body having bearings in which said screw is mounted, means in said bearings for taking up wear, said screw passing through one of said bearings, said body having a recess, a member on said screw entering said recess, and jamb nuts and washer on said screw adjacent to one of the bearings for holding the screw against longitudinal movement.

9. A device of the class described comprising a body, a member cooperative with said body and movable longitudinally and vertically with relation to the bottom of said body, means whereby the said member may be moved in such manner that the longitudinal movement thereof will be greater than the vertical movement thereof, said body having measuring and indicating scales, arranged whereby movement of the movable member may be measured and whereby longitudinal movement of the said movable member will effect an indication of the degree of vertical movement thereof, and adjustable means whereby the range of use of said device may be varied at will, said means whereby said member may be moved including a feed screw, said body having a thrust bearing in which one end of said feed screw lies, said body having another bearing through which said feed screw projects, and jamb nuts and washer on said screw engaging said other bearing to maintain said screw in the thrust bearing against longitudinal movement and to take up wear.

10. A device of the class described comprising a body which includes an inclined portion, a movable member slidably cooperative with said inclined portion, means for moving said movable member along said inclined portion, and said body having measuring and indicating scales for measuring and indicating the movement of said movable member, said moving means including a feed screw, said body having bearings for said feed screw, one of which constitutes a thrust bearing, means for holding the screw in its bearings against longitudinal movement away from the thrust bearing, and connections between said movable member and said screw.

11. A device of the class described comprising a body which includes an inclined portion, a movable member slidably cooperative with said inclined portion, means for moving said movable member along said inclined portion, said body having measuring and indicating scales for measuring and indicating the movement of said movable member, said moving means including a feed screw, said body having bearings for said feed screw, one of which constitutes a thrust bearing, means for holding the screw in its bearings against longitudinal movement away from the thrust bearing, connections between said movable member and said screw, and means in said bearings whereby the turning movement of said screw may be tightened or loosened as desired.

12. A device of the class described comprising a base body having a flat base and an inclined portion, a slidable gauge block cooperative with said body and slidable along the inclined portion thereof, a screw mounted on said body for moving said gauge block, means for measuring rotation of said screw, a turning head on said screw for rotating the same, and cooperative measuring and indicating scales arranged whereby movement of the slidable gauge block may be measured and whereby longitudinal movement of said slidable gauge block along said inclined portion will effect an indication of the degree of vertical movement thereof up said inclined portion, and means associated with said screw and body for taking up wear in the screw and bearings.

13. A device of the class described comprising a base body, having a flat base and a portion inclined at the rate of 4.8" per foot, a slidable gauge block cooperative with said body and slidable along the inclined portion thereof, a screw mounted on said body, cooperative with said gauge block for sliding the same and having a pitch of forty threads to the inch, a turning head on said screw for rotating the same, means for measuring rotation of said screw, and cooperative measuring and indicating scales arranged whereby movement of the slidable gauge block may be measured and whereby longitudinal movement of said slidable gauge block along said inclined portion will effect a registering of the degree of vertical movement thereof up said incline.

14. A device of the class described comprising a base body having a flat base and an inclined portion and being hollowed to provide side walls and front and rear end walls, a slidable gauge block cooperative with said body and slidable along the inclined portion thereof, said gauge block having a height measuring marking thereon, a portion pendent from said gauge block adapted to be guided in the hollow of said base body and having a threaded aperture, a screw for moving said gauge block, split bearings for said screw in the front and rear walls of said base body in which the said screw may rotate on an axis parallel to the inclined portion of the base body, means for adjusting frictional engagement of said bearings with said screw, a turning head on said screw for rotating the same, said screw having means for measuring its rotation, said base body having a measuring scale at one side for cooperating with the marking on that side of the gauge block, the individual divisions of said scale being two and a half times as long as the actual vertical lift which they indicate.

15. A micrometer height gauge comprising a base, a gauge block, means to move said block along the base longitudinally and vertically in a path at an angle 23° 36.14' (4.8" rise per foot) to the base horizontal, a decimal scale on the base to indicate the heights to which the block is moved, and a smaller division scale cooperating with the block moving means and the decimal scale.

16. A micrometer height gauge comprising a base having a surface inclined to the base and slotted through said inclined surface, said base having a pair of screw receiving bearings, the axes of which coincide and lie parallel with said inclined surface, split bearing bushings mounted in said bearings of the base, means carried by the base and engaging said bushings for adjusting their gripping tension, a feed screw mounted in said bushings, a gauge block slidably mounted on said inclined surface and having a portion projected into the base and engaged by said feed screw, one end of said feed screw being convexed to engage a wall in one of the bearings of said base, thereby acting as a thrust bearing, and means on said screw and engaging the base for maintaining contact between said screw end and the adjacent surface of the base bearing in which it is mounted, and means by which said screw may be turned to adjust the position of said gauge block along said inclined surface.

GEORGE J. HARDGROVE.